United States Patent
Bauer et al.

(10) Patent No.: US 11,010,502 B2
(45) Date of Patent: May 18, 2021

(54) METHOD AND DEVICE FOR GENERATING A SECTIONAL VIEW OF A BODY OF A VEHICLE

(71) Applicant: Bayerische Motoren Werke Aktiengesellschaft, Munich (DE)

(72) Inventors: Johannes Bauer, Weissig am Raschuetz (DE); Adrian Golling, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 392 days.

(21) Appl. No.: 15/914,927

(22) Filed: Mar. 7, 2018

(65) Prior Publication Data

US 2018/0196912 A1    Jul. 12, 2018

Related U.S. Application Data

(63) Continuation of application No. PCT/EP2016/069160, filed on Aug. 11, 2016.

(30) Foreign Application Priority Data

Sep. 8, 2015 (DE) .......................... 10 2015 217 149

(51) Int. Cl.
*G06F 17/50* (2006.01)
*G06F 30/15* (2020.01)
(Continued)

(52) U.S. Cl.
CPC .............. *G06F 30/15* (2020.01); *G06F 30/00* (2020.01); *G06F 2119/18* (2020.01)

(58) Field of Classification Search
CPC ...... G06F 30/00; G06F 2111/02; G06F 30/17; G06F 3/0482; G06F 3/04815;
(Continued)

(56) References Cited

U.S. PATENT DOCUMENTS

| | | | | | |
|---|---|---|---|---|---|
| 4,712,637 | A | * | 12/1987 | Mogi | B62K 11/04 180/219 |
| 5,597,335 | A | * | 1/1997 | Woodland | B63B 7/082 114/345 |

(Continued)

FOREIGN PATENT DOCUMENTS

| | | |
|---|---|---|
| CN | 101537567 A | 9/2009 |
| DE | 10 2006 059 829 A1 | 6/2008 |
| KR | 10-2011-0068236 A | 6/2011 |

OTHER PUBLICATIONS

Hahn Vehicle Sketch Pad: A Parametric Geometry Modeler for Conceptual Aircraft Design 48th AIAA Aerospace Sciences Meeting Including the New Horizons Forum and Aerospace Exposition, Jan. 2010) (Year: 2010).*

(Continued)

*Primary Examiner* — Rehana Perveen
*Assistant Examiner* — Cuong V Luu
(74) *Attorney, Agent, or Firm* — Crowell & Moring LLP

(57) ABSTRACT

A method for generating a sectional view of a body of a vehicle includes displaying a first sectional view of the vehicle body on a screen, where the first sectional view comprises two surfaces of two components of the vehicle body which adjoin one another at a first transition point. The method includes displaying a joint catalog with a plurality of predefined joint types, where one joint type of the plurality of predefined joint types defines a predefined joint section for a joint between two surfaces. The method also includes detecting a selection of a first joint type from the joint catalog, and automatically inserting the predefined joint section for the first joint type at the first transition point into the first sectional view displayed on the screen, with the result that the surfaces of the two components are connected to one another at the first transition point by the joint section.

18 Claims, 3 Drawing Sheets

(51) Int. Cl.
*G06F 30/00* (2020.01)
*G06F 119/18* (2020.01)

(58) Field of Classification Search
CPC ............. G06F 3/04845; G06F 3/04842; G06F 16/954; G06F 3/048; G06F 3/14; G06F 17/50; G06T 11/60; G06T 17/00; G06T 19/20; G06T 2200/24; G06T 15/00; G05B 19/4097; G09B 19/00; H04L 9/00; G01L 5/00

See application file for complete search history.

(56) References Cited

U.S. PATENT DOCUMENTS

| | | | | |
|---|---|---|---|---|
| 5,947,051 | A * | 9/1999 | Geiger | B62D 57/00 114/222 |
| 7,556,114 | B2 * | 7/2009 | Hanagan | B62K 11/00 180/219 |
| 2004/0010398 | A1 * | 1/2004 | Noma | G06F 30/15 703/1 |
| 2006/0095235 | A1 * | 5/2006 | Furtado | G06F 30/15 703/1 |
| 2007/0186094 | A1 * | 8/2007 | Ghantous | G06F 30/18 713/153 |
| 2008/0189053 | A1 * | 8/2008 | Breed | B60N 2/0276 702/41 |
| 2009/0033656 | A1 * | 2/2009 | Larkins | G06T 17/00 345/419 |
| 2013/0035906 | A1 * | 2/2013 | Schmidt-Schäffer | G06F 30/15 703/1 |
| 2017/0031350 | A1 * | 2/2017 | Dew | G05B 19/4097 |
| 2019/0103037 | A1 * | 4/2019 | Lussier | G09B 19/0069 |

OTHER PUBLICATIONS

PCT/EP2016/069160, International Search Report dated Nov. 29, 2016 (Three (3) pages).

German Search Report issued in German counterpart application No. 10 2015 217 149.3 dated Jul. 1, 2016, with Statement of Relevancy (Ten (10) pages).

Barnes et al., "Decision support for sequence generation in an assembly oriented design environment", Robotics and Computer Integrated Manufacturing Elsevier Science Publishers BV., Barking, GB, vol. 20, No. 4, Aug. 1, 2004, pp. 289-300, XP004511012.

Novgorod, "K3-Cottage: CAD system for modeling of milled log houses", May 27, 2015, pp. 1-246, XP055320262, URL:http://files.k3-cottage.com/doc/English_7.2.pdf [retrieved on Nov. 17, 2016].

Yubing et al., "Active variation compensation in vehicle body conceptual assembly", The International Journal of Advanced Manufacturing Technology, Springer, Berlin, DE, vol. 37, No. 1-2, Mar. 6, 2007, pp. 178-190, XP019619855.

Chinese Office Action issued in Chinese application No. 201680034113.0 dated Aug. 3, 2020, with English translation (Fifteen (15) pages).

* cited by examiner

METHOD AND DEVICE FOR GENERATING A SECTIONAL VIEW OF A BODY OF A VEHICLE

CROSS REFERENCE TO RELATED APPLICATIONS

This application is a continuation of PCT International Application No. PCT/EP2016/069160, filed Aug. 11, 2016, which claims priority under 35 U.S.C. § 119 from German Patent Application No. 10 2015 217 149.3, filed Sep. 8, 2015, the entire disclosures of which are herein expressly incorporated by reference.

BACKGROUND AND SUMMARY OF THE INVENTION

The invention relates to a method and to a corresponding device which assist a user in the design phase of a vehicle in determining a possible technical implementation of a vehicle body.

During the design phase of a vehicle (in particular of a road vehicle, for example a motorcycle), the design of the vehicle body is typically revised and refined multiply. In this context, CAD (Computer Aided Design) programs are usually used to determine information about the installation space and the technical manufacturing capability of the vehicle body. A current design of the vehicle body can be scanned optically in a three-dimensional fashion and the point clouds which result from this can subsequently be combined to form utilizable surfaces of components.

In order to check the technical implementation capability of a vehicle body part, a sectional diagram covering the entire circumference of the vehicle body part can be generated. This sectional diagram also includes concept sections or sectional views of the divisions between the components, also referred to below as joints. A concept section or a sectional view comprises here a locally limited section at a specific position of the vehicle body. The sectional view represents the geometry planned there and therefore at the same time the required installation space in a plane.

The generation of a sectional view is typically time-consuming. In this context, in particular the division of the vehicle body into technically implementable components proves to be time-consuming. The present document is concerned with the technical problem of providing a computer-implemented method and a corresponding device which permit a user to speed up the generation of a sectional view of a vehicle body.

The problem is solved by the independent claims. Advantageous embodiments are described, inter alia, in the dependent claims.

According to one aspect, a method for generating a sectional view of a vehicle body (in particular of a road vehicle such as, for example, a motorcycle or a passenger car) is described. Alternatively or additionally, the method can be configured to generate or update a three-dimensional model of a vehicle body. The method can be executed on a computer with a screen. In this context, the method can be implemented as part of a CAD (Computer Aided Design) program.

The invention comprises displaying a first sectional view of the vehicle body on a screen. In this context, the first sectional view can be generated on the basis of a current three-dimensional model of the vehicle body (e.g. for a specific first sectional plane) and displayed on the screen. The first sectional view comprises two surfaces of two different components of the vehicle body which adjoin one another at a first transition point. The first transition point is typically located on the selected first sectional plane for which the first sectional view has been generated. The surfaces of the components can be displayed in the first sectional view, e.g. as one-dimensional lines.

The method also comprises displaying a joint catalog with a multiplicity of predefined joint types. In this context, one joint type defines a predefined joint section for a joint between two mutually adjoining surfaces. The different joint types typically have different joint sections.

One joint type of the multiplicity of predefined joint types can also define a three-dimensional model of a corresponding joint. It is therefore possible for the three-dimensional model of the vehicle body to have a joint between the two components added to it in an efficient way on the basis of a selected joint type.

One joint type of the multiplicity of predefined joint types is typically configured in such a way that a corresponding joint between two components can actually be fabricated in a manufacturing method. In other words, the predefined joint types can be defined in such a way that the corresponding joints can also be manufactured (where possible in an efficient way). It is therefore possible for errors during the generation of a three-dimensional model of the vehicle body, which affect the manufacture of an actual vehicle body on the basis of the three-dimensional model, to be avoided early.

The method also comprises detecting a selection of a first joint type from the joint catalog. The selection can be detected, in particular, using an input means of a computer.

Furthermore, the method comprises automatically inserting the predefined joint section for the first joint type at the first transition point into the first sectional view displayed on the screen. The joint section can be inserted here in such a way that the surfaces of the two components are connected to one another at the first transition point by the joint section. In particular, the three-dimensional model of the vehicle body can be updated by means of the selected first joint type, with the result that an edge between the two components comprises the joint which corresponds to the first joint type. An updated first sectional view can then be determined from the updated model and displayed on the screen.

Three-dimensional models of a vehicle body can be supplemented with respect to a transition between components in an efficient and reliable way by providing a predefined joint catalog. In particular, the generation of sectional views can be speeded up with a predefined joint catalog.

One joint type can define standard values for one or more joint parameters for the corresponding joint. The one or more joint parameters can comprise e.g. a joint width of the joint section between the surfaces of the two components and/or a protrusion of the surface of a first component over the surface of a second component at the joint section. A joint can be inserted with these standard values into the model of the vehicle body. In particular, the joint section for the first joint type can be inserted into the first sectional view with the standard values for the one or more joint parameters. The addition of a model to the vehicle body and the generation of a sectional view can be speeded up further by providing standard values for joint parameters. Furthermore, possible error sources during the generation of a sectional view can be eliminated.

The method can also comprise detecting an input relating to a value for a joint parameter of the first joint type (e.g. using the input means of a computer). Furthermore, the method can comprise automatically inserting (or adapting) the predefined joint section for the first joint type into the first (or in the first) sectional view with the detected value for the joint parameter. It is therefore possible to permit a user to input values for a joint parameter which differ from a standard value, with the result that the model of the vehicle body and/or the first sectional view can be correspondingly adapted and individualized.

The multiplicity of predefined joint types of the joint catalog can comprise e.g. at least one joint type for a transition to a fuel tank cover as one of the two components. Alternatively or additionally, the multiplicity of predefined joint types of the joint catalog can comprise at least one joint type for a transition to a seat bench of a motorcycle as one of the two components. Expressed in more general terms, the joint catalog can comprise at least one joint type for a transition to an at least partially standardized component with at least partially standardized dimensions. The changing of a value of a joint parameter for such a joint type can be prohibited, with the result that it is automatically ensured that the joint to the standardized component has predefined standardized properties.

The method can also comprise displaying a second sectional view of the vehicle body on the screen, wherein the second sectional view comprises the two surfaces of the two components of the vehicle body which adjoin one another at a second transition point. In other words, it is possible to determine and display a further (i.e. second) sectional view for another sectional plane (from the model of the vehicle body). The method can be embodied in such a way that the predefined joint section for the first joint type is automatically displayed at the second transition point in the second sectional view displayed on the screen (without a renewed selection of the joint type having to be made). This can be done, in particular, by virtue of the fact that when a joint type for the transition between the two components is first selected, the entire model of the vehicle body is updated with respect to the edge between the two components. It is therefore possible to determine any desired sectional views for any desired sectional planes with the joint section subsequent to the updating and to display them on the screen. In this way, the determination of sectional views can be speeded up further.

According to a further aspect, a device (e.g. a computer or a server) for generating a three-dimensional model of a vehicle body is described. The device comprises a processor, input means and a screen. The processor is configured to cause a first sectional view of the vehicle body to be displayed on the screen, wherein the first sectional view comprises two surfaces of two components of the vehicle body which adjoin one another at a first transition point. The first sectional view can be generated on the basis of a current model of the vehicle body.

The processor is also configured to cause a joint catalog with a multiplicity of predefined joint types to be displayed on the screen, wherein one joint type defines a predefined joint section for a joint between two surfaces. Furthermore, the process is configured to determine that a selection of a first joint type from the joint catalog has been made using the input means.

Furthermore, the processor is configured to insert the predefined joint section for the first joint type at the first transition point into the first sectional view displayed on the screen, with the result that the surfaces of the two components are connected to one another at the first transition point by the joint section. Alternatively or additionally, the processor can be configured to update the model of the vehicle body with respect to the joint between the two components by means of the selected first joint type.

According to a further aspect, a software (SW) program is described. The SW program can be configured to be executed on a processor, and to execute, as a result, the method described in this document.

According to a further aspect, a storage medium is described. The storage medium can comprise a SW program which is configured to be executed on a processor and, as a result, to execute the method described in this document.

It is to be noted that the methods, devices and systems described in this document can be used both alone and in combination with other methods, devices and systems described in this document. Furthermore, any aspects of the methods, devices and systems described in this document can be combined with one another in a variety of ways. In particular, the features of the claims can be combined with one another in a variety of ways.

Other objects, advantages and novel features of the present invention will become apparent from the following detailed description of one or more preferred embodiments when considered in conjunction with the accompanying drawings.

BRIEF DESCRIPTION OF THE DRAWINGS

In the text which follows, the invention will be described in more detail with reference to exemplary embodiments.

DETAILED DESCRIPTION OF THE DRAWINGS

As stated at the beginning, the present document is concerned with assisting a user of a CAD program in the technical checking of a design of a vehicle body. In particular, the present document is concerned with enabling a user to generate, in a time-efficient and error-free fashion, a sectional view of a vehicle body from which a technically implementable division of the vehicle body into a multiplicity of components becomes apparent.

Figure 1:
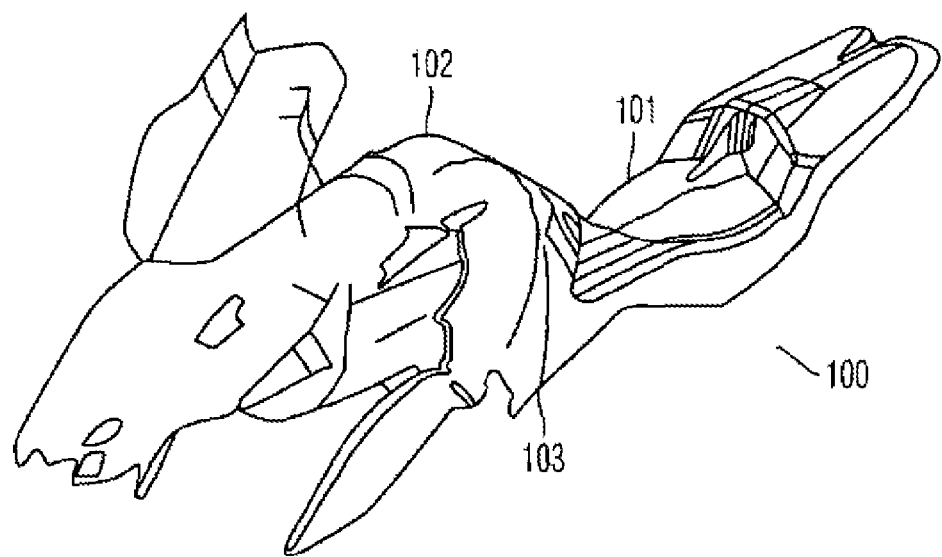
FIG. 1 shows an exemplary vehicle body of a motorcycle.

FIG. 1 shows an exemplary vehicle body 100 of a motorcycle. The vehicle body 100 comprises inter alia a fuel tank 102 and a seat bench 101. Furthermore, FIG. 1 illustrates different sectional planes 103 through the vehicle body 100. For these sectional planes 103 it is possible to generate sectional views from which, in particular, the transition between different components of the bodywork 100 of the motorcycle can become apparent.

Figure 2:
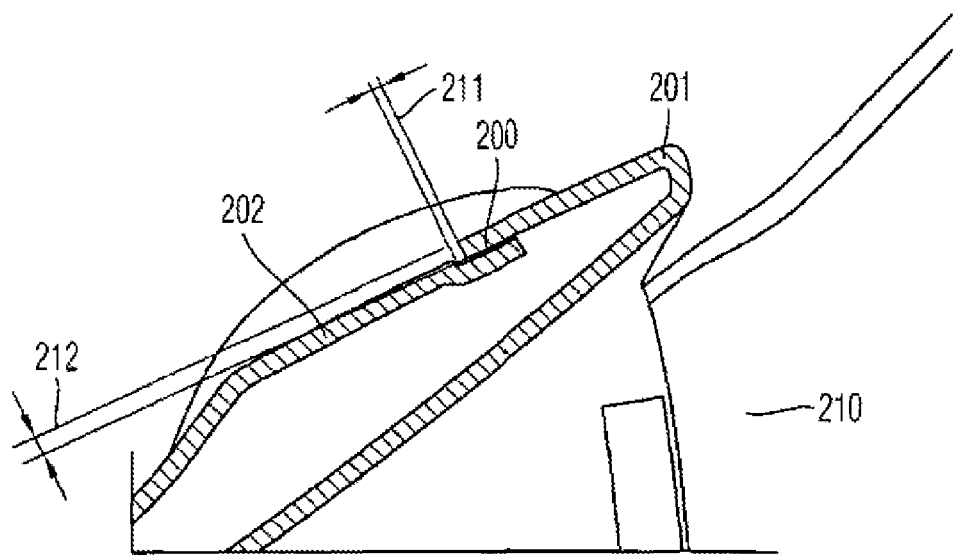
FIG. 2 shows an exemplary joint between two components of a vehicle body.

FIG. 2 shows a detail from an exemplary sectional view 210. In the detail, two components 201, 202 of the vehicle body 100, which are connected to one another by a joint 200, are illustrated. The joint 200 has a specific shape or a specific profile which is suitable for the transition between the two components 201, 202. The shape of the joint 200 can be defined by means of a specific joint type. Furthermore, the joint 200 has one or more joint parameters 211, 212, by means of which a particular joint type can be adapted to the specific conditions of the transition between the two components 201, 202. In the illustrated example, the one or more joint parameters 211, 212 comprise a joint width 211 between the first component 201 and the second component 202 and a protrusion 212 of the first component 201 at the joint 200.

Figure 3:
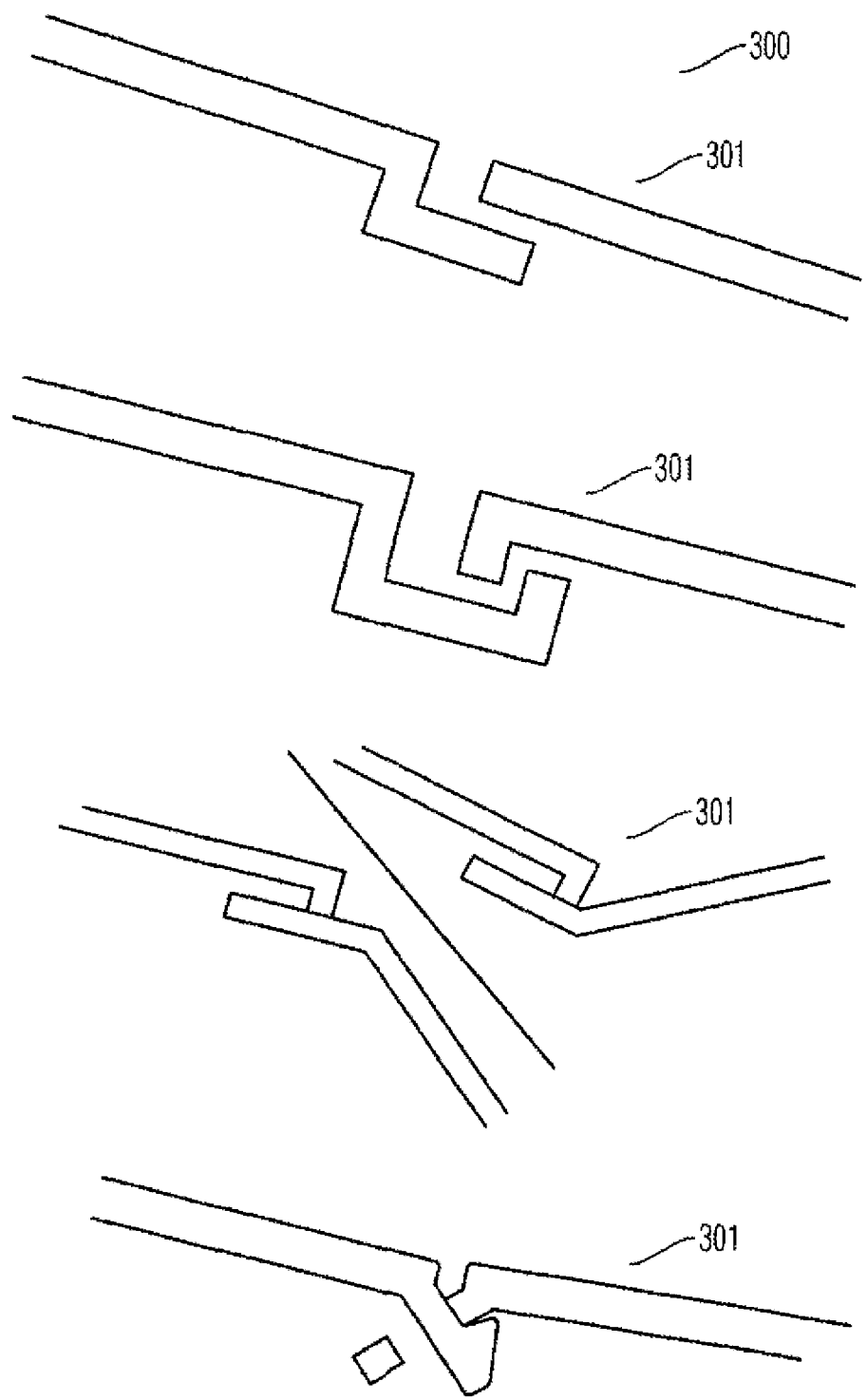
FIG. 3 shows an exemplary catalog of possible joint types for the transition between two components of a vehicle.

The joints 200 between two components 201, 202 can be drawn manually in a CAD program. However, this process is very time-consuming and can give rise to errors. It has become apparent that for the transition between two components 201, 202 the same types of joint 200 are frequently used. In order to speed up the generation of a sectional view 210, a predefined joint catalog 300 can therefore be provided in which a multiplicity of predefined different joint types 301 are defined. Such an exemplary joint catalog 300 is illustrated in FIG. 3.

During the generation of a sectional view 210, a suitable joint type 301 in the predefined joint catalog 301 can be selected for the transition between two components 201, 202. The selected joint type 301 can then be inserted automatically at the mutually adjoining edges of the components 201, 202 by the CAD program, in order to implement the transition between the two components 201, 202. In this context, in a first step default values for the one or more joint parameters 211, 212 of the selected joint type 301 can be used. Where necessary, a user can subsequently change a value of a joint parameter 211, 212 manually.

By providing a predefined joint catalog 300, the generation of a sectional view 210 can be substantially speeded up. Furthermore, errors during the manual generation of a transition between two components 201, 202 can be avoided.

Therefore, concept sections 210 of a vehicle body 100 can be generated in a partially automated fashion. The user can in this context select particular elements (in particular joints 200) of a concept section 210 from a predefined catalog 300, wherein the selected elements are then inserted directly into the model of the vehicle body 100. By providing predefined, standardized elements 301, the quality of a concept section 210 and the resulting vehicle body 100 can be increased, since unsuitable geometries (in particular geometries of joints 200) can be ruled out from the outset.

The catalog 300 can comprise all the relevant dimensions or parameter values of joint geometries or joint types 301 (e.g. joint width, protrusions, associated tolerances etc.) which are often applied as well as sectional illustrations of the joint types 301 with the associated position on the vehicle.

FIG. 2 shows the section through a joint 200 from a typical joint plan. The joint width 211 (e.g. 1 mm) and the protrusion 212 (e.g. 2 mm) with their respective tolerances (of e.g. 0.5 mm) can be seen in the section. FIG. 3 shows an exemplary catalog 300 of the concept sections for standardized joint types 301 which can be used in a CAD program (e.g. CATIA V5).

During the generation of a sectional view 210, a joint type 301 and the associated concept section of the joint (also referred to as a joint section) can be selected. Furthermore, it is possible to determine the position between two components 201, 202 at which a joint 200 according to the selected joint type 301 is to be inserted. For this purpose, it is possible to select in the CAD program the two surfaces which represent the two components 201, 202 in the CAD program. Furthermore, it is possible to define a transition point at which the two surfaces are to be connected by means of a joint 200. A joint 200 according to the selected joint type 301 (typically with predefined values for the joint parameters 211, 212) is then automatically inserted between the two surfaces at the selected point.

The catalog 300 can comprise joint types 301 with corresponding joint sections for joints 200 which connect individual components 201, 202 to one another. The components 201, 202 can comprise here, in particular, a fuel tank cover or a seat bench 101. The components last mentioned are standard components or kit components for which standard dimensions are typically predefined. For example, in the case of a seat bench section a specific foam height, seat bench length and/or a height above the road are legally prescribed or necessary, in order to ensure a specific degree of comfort. Furthermore, in the case of a fuel tank cover, a diameter of a fuel tank opening is typically predefined. These predefined dimensions can be stored and parameterized with the predefined joint types 301 (e.g. as default values of the joint parameters 201, 212). The dimensions can, under certain circumstances, be manually adapted when necessary (apart from in the case of standard components in which the dimensions are already predefined by a supplier or by the legislator).

Figure 4:
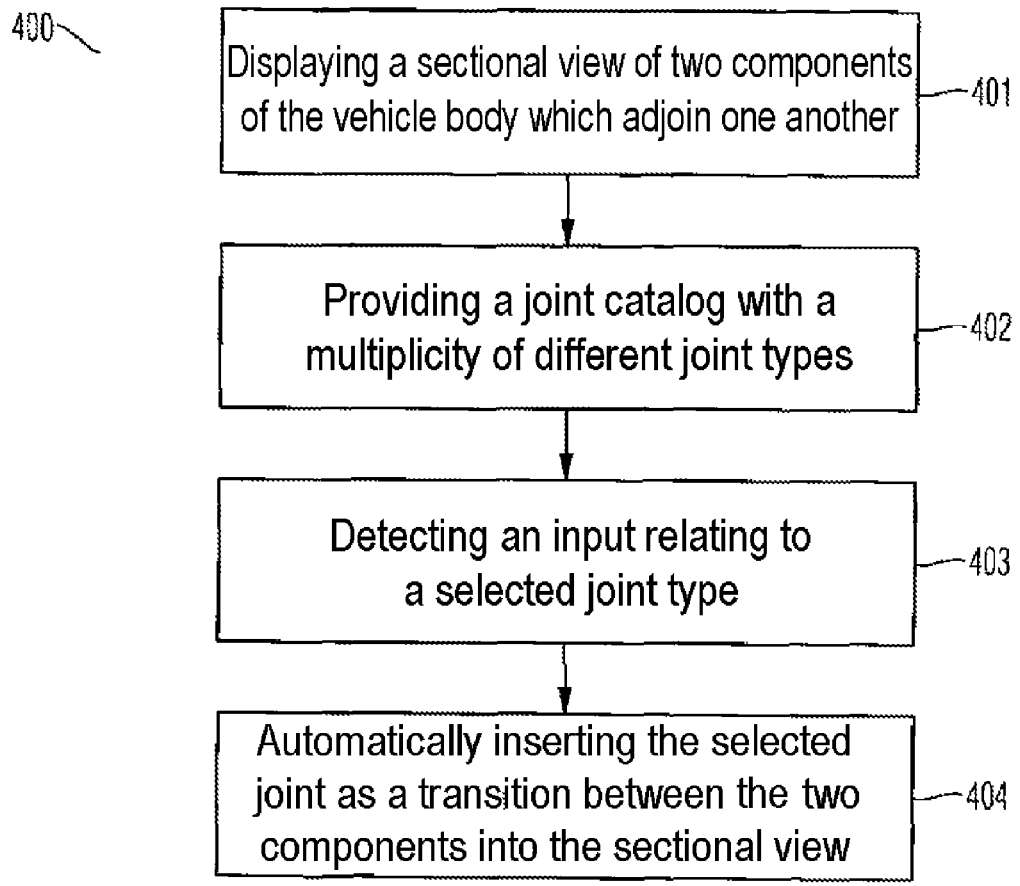
FIG. 4 shows a flowchart of an exemplary method for generating a sectional view of a vehicle body.

FIG. 4 shows a flowchart of an exemplary method 400 for generating a sectional view 210 of a vehicle body 100. The method 400 can be executed on a computer. In particular, the method 400 can be executed by a software program (in particular a CAD program) on a computer.

The method 400 comprises displaying 401 a first sectional view 210 of the vehicle body 100 on a screen, wherein the first sectional view 210 comprises two surfaces of two components 201, 202 of the vehicle body 100 which adjoin one another at a first transition point. A three-dimensional model of the vehicle body 100 is typically used as a basis for the display of the first sectional view 210, said model having been generated e.g. on the basis of a scanned-in design of the vehicle body 100. The vehicle body 100 may have been typically divided into different components here, which ensures that the vehicle body 100 can be manufactured, that different colors can be implemented (on different components 201, 202), and/or that the vehicle body 100 satisfies specific mechanical requirement.

Each component 201, 202 can be represented by a surface with a specific shape in the three-dimensional model. By defining a first sectional plane 103 through the vehicle body 100 it is possible to determine the first sectional view 210, corresponding to the first sectional plane 103, on the basis of the three-dimensional model of the vehicle body 100, and display said sectional view 210 on the screen.

The method 400 also comprises displaying 402 a joint catalog 300 with a multiplicity of predefined joint types 301. The joint catalog 300 can be displayed on the screen, e.g. in reaction to an input by a user of the CAD program. One joint type 301 typically defines here a predefined joint section for a joint 200 between two surfaces. If appropriate, a model for a joint 200 between two randomly shaped components 201, 202 can be generated from the information defined by a joint type 301. In particular, the profile of a corresponding joint 200 can be determined along the edges, adjoining one another, of two components 201, 202 (e.g. perpendicularly with respect to the sectional plane 103). It is therefore possible to define the entire profile of a joint 200 between two components 201, 202 by means of the selection of a joint type 301 for a sectional plane 103.

The method 400 also comprises detecting 403 a selection of a first joint type 301 from the joint catalog 300. The selection can be registered using input means of a computer (e.g. using a keyboard, using a mouse and/or using a touch-sensitive screen).

Furthermore, the method 400 comprises automatically inserting 403 the predefined joint section for the first joint type 301 at the first transition point into the first sectional view 210 displayed on the screen, with the result that the surfaces of the two components 201, 202 are connected to one another at the first transition point by the joint section. For this purpose, the three-dimensional model of the vehicle body can initially be updated on the basis of the selected joint type 301 for the transition between the two components 201, 202. In particular, a joint 200 of the selected joint type 301 can be inserted into the model of the vehicle body 100 along the (entire) edge between the two components 201, 202. From the updated model of the vehicle body 100, the updated first sectional view 210 can then be determined with the joint section between the surfaces of the two components 201, 202 and displayed on the screen.

The method 400 which is described in this document has a multiplicity of advantages. In particular, the method 400 can contribute to quality assurance, since inappropriate joint geometries for a vehicle body 100 can already be automatically ruled out in the concept phase. Furthermore, by providing predefined joint types 301 it is possible to ensure a consistent appearance of the joints (e.g. consistent joint widths 211 and/or consistent protrusions 212). Furthermore, joint geometries (e.g. undercuts) which cannot be fabricated within the scope of a manufacturing method can be automatically avoided. Furthermore, by means of the method 400 described it is possible to generate sectional views 210 with a reduced time consumption and with a reduced error rate. The manual adaptation of values of the joint parameters 211, 212 permits efficient individualization of the predefined joint types 301.

The present invention is not limited to the exemplary embodiments shown. In particular it is to be noted that the description and the figures are intended to illustrate only the principle of the proposed methods, devices and systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for generating a sectional view of a vehicle body, wherein the method comprises the acts of:
    displaying a first sectional view of the vehicle body on a screen, wherein the first sectional view is of two surfaces of two components of the vehicle body which adjoin one another at a first transition point;
    displaying, in connection with the first sectional view, a joint catalog with a plurality of predefined joint types, wherein each joint type of the plurality of predefined joint types defines a predefined joint section for a joint between two surfaces, wherein a first joint type is selectable by a user viewing the displayed joint catalog from among the plurality of predefined joint types;
    detecting a selection of the first joint type from the joint catalog by the user; and
    in response to the selection, automatically modifying the first sectional view of the vehicle body displayed on the screen such that the predefined joint section for the first joint type is provided at the first transition point, with the result that the surfaces of the two components are connected, in the modified first sectional view, to one another at the first transition point by the joint section.

2. The method as claimed in claim 1, wherein one joint type of the plurality of predefined joint types defines standard values for one or more joint parameters for the corresponding joint; and the joint section for the first joint type is inserted with the standard values for the one or more joint parameters.

3. The method as claimed in claim 2, wherein the one or more joint parameters comprise at least one of:
    a joint width of the joint section between the surfaces of the two components; and
    a protrusion of the surface of a first component over the surface of a second component at the joint section.

4. The method as claimed in claim 2, further comprising:
    detecting an input relating to a value for a joint parameter of the first joint type; and
    automatically inserting the predefined joint section for the first joint type into the first sectional view with the detected value for the joint parameter.

5. The method as claimed in claim 3, further comprising:
    detecting an input relating to a value for a joint parameter of the first joint type; and
    automatically inserting the predefined joint section for the first joint type into the first sectional view with the detected value for the joint parameter.

6. The method as claimed in claim 1, wherein the plurality of predefined joint types comprises at least one of:
    at least one joint type for a transition to a fuel tank cover as one of the two components; and
    at least one joint type for a transition to a seat bench of a motorcycle as one of the two components.

7. The method as claimed in claim 2, wherein the plurality of predefined joint types comprises at least one of:
    at least one joint type for a transition to a fuel tank cover as one of the two components; and
    at least one joint type for a transition to a seat bench of a motorcycle as one of the two components.

8. The method as claimed in claim 3, wherein the plurality of predefined joint types comprises at least one of:
    at least one joint type for a transition to a fuel tank cover as one of the two components; and
    at least one joint type for a transition to a seat bench of a motorcycle as one of the two components.

9. The method as claimed in claim 4, wherein the plurality of predefined joint types comprises at least one of:
    at least one joint type for a transition to a fuel tank cover as one of the two components; and
    at least one joint type for a transition to a seat bench of a motorcycle as one of the two components.

10. The method as claimed in claim 1, further comprising:
    displaying a second sectional view of the vehicle body on the screen, wherein the second sectional view comprises the two surfaces of the two components of the vehicle body which adjoin one another at a second transition point; and
    automatically displaying the predefined joint section for the first joint type at the second transition point in the second sectional view displayed on the screen.

11. The method as claimed in claim 2, further comprising:
    displaying a second sectional view of the vehicle body on the screen, wherein the second sectional view comprises the two surfaces of the two components of the vehicle body which adjoin one another at a second transition point; and
    automatically displaying the predefined joint section for the first joint type at the second transition point in the second sectional view displayed on the screen.

12. The method as claimed in claim 3, further comprising:
    displaying a second sectional view of the vehicle body on the screen, wherein the second sectional view comprises the two surfaces of the two components of the vehicle body which adjoin one another at a second transition point; and automatically displaying the predefined joint section for the first joint type at the second transition point in the second sectional view displayed on the screen.

13. The method as claimed in claim 4, further comprising:
displaying a second sectional view of the vehicle body on the screen, wherein the second sectional view comprises the two surfaces of the two components of the vehicle body which adjoin one another at a second transition point; and automatically displaying the predefined joint section for the first joint type at the second transition point in the second sectional view displayed on the screen.

14. The method as claimed in claim 6, further comprising:
displaying a second sectional view of the vehicle body on the screen, wherein the second sectional view comprises the two surfaces of the two components of the vehicle body which adjoin one another at a second transition point; and automatically displaying the predefined joint section for the first joint type at the second transition point in the second sectional view displayed on the screen.

15. The method as claimed in claim 1, wherein one joint type of the plurality of predefined joint types defines a three-dimensional model of a corresponding joint.

16. The method as claimed in claim 1, wherein one joint type of the plurality of predefined joint types is configured such that a corresponding joint between two components can be fabricated in a manufacturing process.

17. The method as claimed in claim 1, wherein the method is executed by means of a CAD program on a computer with the screen.

18. A device for generating a three-dimensional model of a vehicle body, wherein the device comprises a processor, input means and a screen, and wherein the processor is configured to:

display, on the screen, a first sectional view of the vehicle body, wherein the first sectional view is of two surfaces of two components of the vehicle body which adjoin one another at a first transition point;

display, on the screen and in connection with the first sectional view, a joint catalog with a plurality of predefined joint types, wherein each joint type defines a predefined joint section for a joint between two surfaces, wherein a first joint type is selectable by a user viewing the displayed joint catalog from among the plurality of predefined joint types;

determine that a selection of the first joint type from the joint catalog has been made using the input means; and in response to the selection, automatically modifying the first sectional view of the vehicle body displayed on the screen such that the predefined joint section for the first joint type at the first transition point, with the result that the surfaces of the two components are connected, in the modified first sectional view, to one another at the first transition point by the joint section.

* * * * *